United States Patent [19]

Byrd et al.

[11] 4,191,517
[45] Mar. 4, 1980

[54] METHOD AND APPARATUS FOR IMPARTING A PREDETERMINED SHAPE TO PRODUCT OF DOUGH-LIKE CONSISTENCY

[75] Inventors: Alan E. Byrd, Hamilton; John S. Amneus, Cincinnati; Malcolm B. Lucas, Cincinnati; Robert H. Van Coney, Cincinnati; James E. Van Loan, Cincinnati, all of Ohio

[73] Assignee: The Procter & Gamble Company, Cincinnati, Ohio

[21] Appl. No.: 909,141

[22] Filed: May 24, 1978

[51] Int. Cl.² ................................................. B28B 7/12
[52] U.S. Cl. ........................................ 425/286; 264/334; 425/282
[58] Field of Search ........ 425/282, 187, 276, 436 RM, 425/286, 318, DIG. 124, DIG. 44, DIG. 58, DIG. 57, 283, 279, 437, 440; 249/66 A, 112, 127, 120, 121, 122; 264/334

[56] References Cited

U.S. PATENT DOCUMENTS

| 859,124 | 7/1907 | Short | 425/437 |
|---|---|---|---|
| 1,255,906 | 2/1918 | Miller, Jr. | 425/282 |
| 1,698,716 | 1/1929 | Cox | 425/282 |
| 2,191,524 | 2/1940 | Ellis | 425/282 X |
| 2,213,902 | 9/1940 | Daniels | 425/436 RM |
| 2,260,689 | 10/1941 | Miller | 425/282 |
| 2,990,789 | 7/1961 | Smith | 425/282 |
| 3,347,966 | 10/1967 | Seefluth | 425/DIG. 44 |

Primary Examiner—Richard B. Lazarus
Assistant Examiner—John S. Brown
Attorney, Agent, or Firm—E. Kelly Linman; John V. Gorman; Richard C. Witte

[57] ABSTRACT

Method and apparatus for imparting a predetermined shape to discrete units of product of dough-like consistency. In a preferred embodiment, said method comprises filling an image containing cavity exhibiting said shape with said dough-like product and thereafter removing said product from said cavity without substantially altering its shape by causing said cavity to assume an image substantially symmetrical to its original image. In a particularly preferred embodiment, the image containing cavity is lined with a resiliently deformable diaphragm, and the cavity is turned inside out by applying fluid pressure to the surface of the diaphragm opposite the product.

4 Claims, 2 Drawing Figures

METHOD AND APPARATUS FOR IMPARTING A PREDETERMINED SHAPE TO PRODUCT OF DOUGH-LIKE CONSISTENCY

TECHNICAL FIELD

The present invention relates to the preparation of discrete units of dough-like product of predetermined size and shape.

The present invention has further relation to method and apparatus for removing dough-like product from a mold cavity of predetermined size and shape without substantial alteration of the molded product during the removal process.

Even more particularly, the present invention relates to sanitary method and apparatus for forming discrete units of individual food product such as cookies from a dough and reliably removing the preformed dough from the forming cavity without need for manual intervention.

In a particularly preferred embodiment, the present invention has relation to a highly reliable, low cost cookie scoop which will permit the consumer to produce discrete units of cookie dough of uniform size and shape, thereby permitting more precise control over the quality of the resultant cookies.

BACKGROUND ART

Dispensing apparatus for discharging measured amounts of product in manual fashion are well known in the art. For example, U.S. Pat. No. 2,990,789 issued to Smith on July 4, 1961 discloses an ice cream dipper wherein a hemispherical bowl is joined to a hollow handle equipped with a squeezable bulb and an air vent. Ice cream is discharged from the scoop by blocking the air vent and squeezing the bulb to discharge air intermediate the ice cream within the hemispherical bowl and the walls of the bowl. U.S. Pat. No. 2,260,689 issued to Miller on Oct. 28, 1941 discloses, in a preferred embodiment, another pneumatically-actuated ice cream scoop wherein air from a squeeze bulb within the handle is introduced intermediate the ice cream in the bowl and the walls of the bowl to effect discharge. To facilitate the flow of air evenly in all directions, a flexible deflector disc of dished form is carried by the inner wall section of the Miller scoop. The peripheral margin of the deflector disc is flexed away from the bowl when air is introduced through the openings behind the disc, thereby allowing the air to pass between the walls of the bowl and the ice cream contained therein.

While such prior art apparatus function to dispense predetermined quantities of a product such as ice cream, they do not function reliably when utilized to dispense materials of adherent, dough-like consistency such as cookie dough. Materials of dough-like consistency generally tend to adhere to the walls of the dispensing apparatus, thus making reliable dispensing of discrete units of product of predetermined size and shape difficult without manual intervention, as by one's finger. Prior art attempts to solve this problem have taken the form of integral wiper mechanisms located within the product containing chamber of the dispensing apparatus, mechanically actuated scrapers mounted within the product chamber, and the like. However, due to the tendency of adherent, dough-like materials to cling to both the chamber walls and the wiping or scraping mechanism, such devices have likewise proven ineffective. Furthermore, prior art dispensing apparatus of the type described above are extremely difficult to clean and maintain in a sanitary condition suitable for handling a food product. In addition, such prior art apparatus are complex and difficult to manufacture, thereby necessitating relatively high cost.

Accordingly, it is an object of the present invention to provide highly reliable method and apparatus for forming and discharging discrete units of adherent, dough-like product of predetermined size and shape without need for manual intervention to remove the product from the dispensing apparatus.

It is a further object of the present invention to provide highly reliable dispensing apparatus for said dough-like product which may be readily maintained in a sanitary condition.

It is still a further object of the present invention to provide dispensing apparatus for said dough-like product which can be easily manufactured at low cost.

DISCLOSURE OF INVENTION

In a preferred embodiment, method and apparatus for imparting a predetermined size and shape to discrete units of product having an adherent, dough-like consistency are provided. The method comprises filling an image containing cavity exhibiting the desired shape with the dough-like product and thereafter removing the product from the cavity without substantially altering its shape by turning the cavity inside out. In turning the cavity inside out, the cavity is in effect caused to assume an image which is substantially symmetrical to that originally exhibited. In yet another preferred embodiment of the present invention, a highly reliable dispensing apparatus for imparting a predetermined size and shape to discrete units of product of dough-like consistency is provided. The dispensing apparatus preferably comprises a substantially rigid cavity or bowl embodying the predetermined shape, said bowl having a resiliently deformable diaphragm substantially conforming to and disposed within the bowl and secured in sealed relation thereto about its periphery. The dispensing apparatus further includes means for injecting a sufficient quantity of fluid, preferably a compressible fluid such as air, intermediate the rigid bowl and the unsecured portion of the resiliently deformable diaphragm to invert the unsecured portion of the diaphragm from the bowl and thereby discharge the product without substantially altering its shape. In a particularly preferred embodiment of the present invention, the means for injecting said fluid comprises an elongated handle secured to the exterior of the bowl, said handle including a closed, resiliently deformable chamber in fluid communication with the area intermediate the rigid bowl and the unsecured portion of the resiliently deformable diaphragm.

BRIEF DESCRIPTION OF THE DRAWINGS

While the specification concludes with claims particularly pointing out and distinctly claiming the subject matter which is regarded as the present invention, it is believed that the invention will be better understood from the following description taken in connection with the accompanying drawings, in which:

DETAILED DESCRIPTION OF THE PRESENT INVENTION

Figure 1:
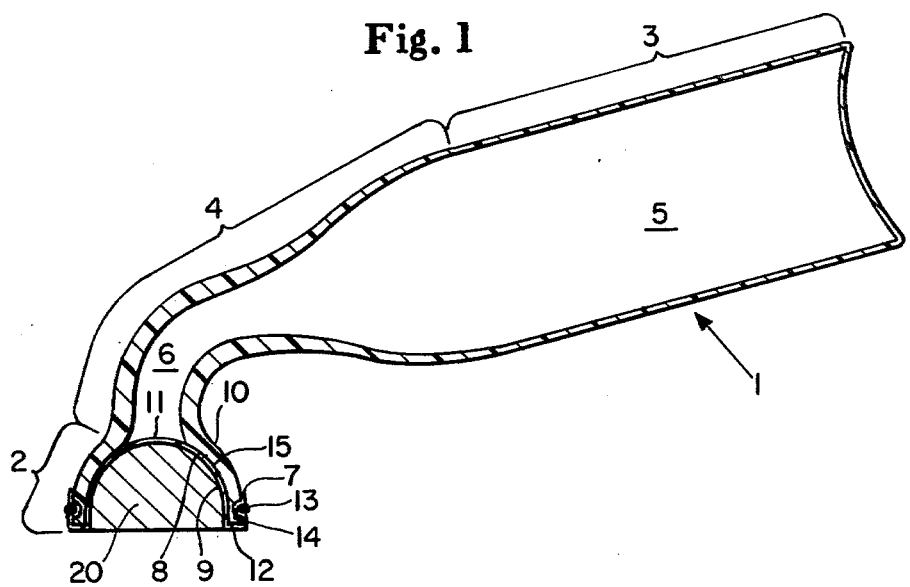
FIG. 1 is a simplified, cross-sectional illustration of a preferred dispensing apparatus of the present invention shown after the bowl has been filled with a product of dough-like consistency.

Referring to FIG. 1, there is shown a preferred dispensing apparatus 1 of the present invention. While the present invention is by no means limited to the manually operated embodiment illustrated in FIG. 1, the invention will, for simplicity, be described in connection with the illustrated embodiment. In this regard, it will be understood by those skilled in the art that the present invention may be practiced to advantage in highly automated, high speed processes for forming and dispensing discrete units of dough-like product of predetermined size and shape. The illustrated dispensing apparatus 1 preferably comprises a substantially rigid bowl portion 2 joined at a point along its exterior surface 10 to a neck portion 4 which, in a preferred embodiment is also substantially rigid, said neck portion in turn being joined to a resiliently deformable handle portion 3 which is preferably cylindrical in cross-section. Disposed within the bowl portion 2 of the dispensing apparatus 1 is a resiliently deformable diaphragm 7 secured in sealed relation to the bowl portion about its entire periphery by means of an O-ring 13 residing within a circumferential groove 14 formed in the exterior surface 10 of the bowl portion. In the illustrated embodiment, the bowl portion 2 is substantially hemispherical. It should, however, be noted that the present invention may be practiced to advantage to produce discrete units of product having nearly any size and shape, provided only that the shape does not exhibit an inverse taper which would preclude its removal from the bowl without substantial deformation.

In the illustrated embodiment, the handle portion 3 of the dispensing apparatus forms a totally enclosed, resiliently deformable chamber 5 which, by virtue of passageway 6 and orifice 11, remains in fluid communication with the area intermediate the interior surface 8 of bowl portion 2 and the interior surface 15 of resiliently deformable diaphragm 7. Because the resiliently deformable diaphragm 7 substantially conforms to the interior surface 8 of the bowl portion 2, the substantially rigid bowl portion gives the dispensing apparatus 1 sufficient mechanical rigidity to permit filling thereof with a dough-like product 20 by manual manipulation, i.e., as from a bowl containing said dough-like product.

In the illustrated embodiment, the substantially rigid bowl portion 2 and the substantially rigid neck portion 4 permit the use of a resiliently deformable handle portion 3 without adversely affecting the mechanical strength of the dispensing apparatus during the aforedescribed product filling operation. In this regard, the disclosed dispensing apparatus functions with a degree of efficiency comparable to prior art dispensing apparatus of entirely rigid construction. Depending upon such variables as the stiffness of the dough-like product to be dispensed, it may in certain instances be feasible to utilize a resiliently deformable neck portion 4 as well as a resiliently deformable handle portion 3 in dispensing apparatus of the present invention.

As with prior art dispensing apparatus, once the bowl portion 2 of the dispensing apparatus has been filled with dough-like product 20, the excess material is preferably wiped off to leave the bowl in a substantially filled condition. The product contained in the bowl portion 2 exhibits substantially the same shape as the exterior surface 9 of the resiliently deformable diaphragm 7 disposed within and conforming to the bowl portion.

Figure 2:
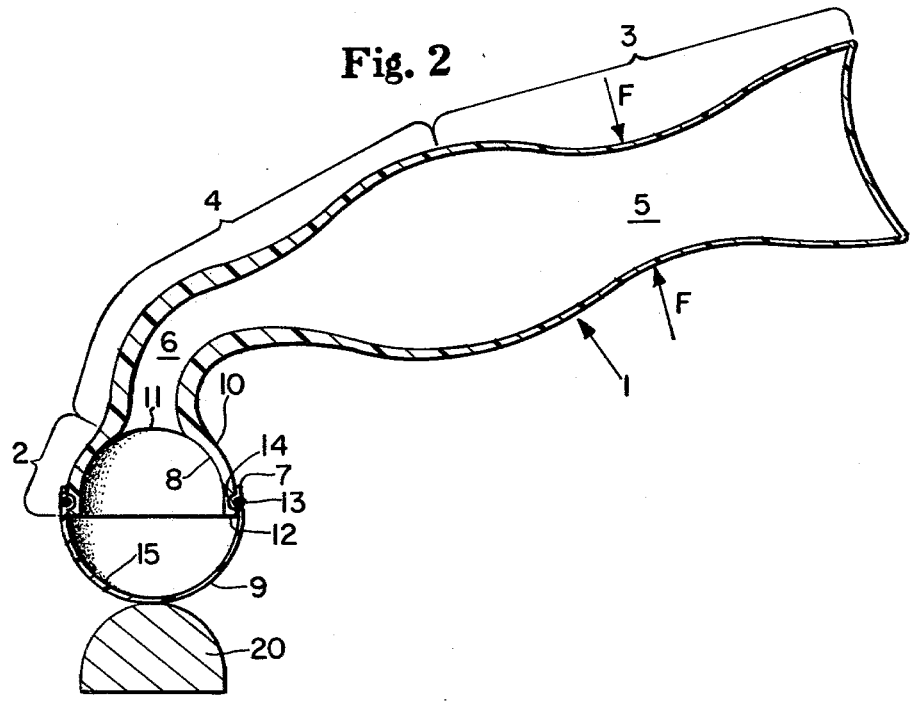
FIG. 2 is a cross-sectional illustration of the dispensing apparatus illustrated in FIG. 1 shown as the product is being discharged from the bowl by the application of force to the handle.

FIG. 2 illustrates the manner in which dispensing apparatus 1 functions to remove the preshaped product 20 from the bowl 2 without need for manual intervention to separate the product from the exterior surface 9 of the diaphragm 7. In particular, a pair of opposing forces, designated F in FIG. 2, are applied by squeezing the resiliently deformable handle portion 3 of the dispensing apparatus 1, thereby deforming the handle portion. Because the diaphragm 7 is secured in sealed relation to the bowl portion 2 of the dispensing apparatus, the volume of fluid contained within the resiliently deformable chamber 5 of handle portion 3 is not allowed to escape from the interior portions of the dispensing apparatus. Accordingly, the fluid from chamber 5, which preferably comprises a compressible fluid such as air, is displaced through passageway 6 and orifice 11 so as to exert force against the unsecured portion of the interior surface 15 of the resiliently deformable diaphragm 7. This causes the unsecured portion of the diaphragm 7 to separate from the interior surface 8 of the bowl portion 2 of the dispensing apparatus. As greater and greater forces F are applied to the resiliently deformable handle portion 3 of the dispensing apparatus, the diaphragm 7 is gradually inverted from the substantially rigid bowl portion 2 of the dispensing apparatus. As can be seen in FIG. 2, the diaphragm 7 is caused to assume an image which is substantially symmetrical to that originally exhibited when the diaphragm was disposed within the confines of the bowl.

With the hemispherically shaped bowl 2 illustrated in FIGS. 1 and 2, this essentially reduces contact between the exterior surface 9 of the diaphragm 7 and the product 20 discharged therefrom to a single point, thereby facilitating separation due to gravitational forces without need for manual intervention. As should also be noted from FIG. 2, the shape of the dough-like product 20 discharged from the bowl portion of the dispensing apparatus emerges in a substantially unaltered configuration due to the gradual inversion action which the diaphragm 7 undergoes during the dispensing operation.

As will be appreciated by those skilled in the art, the diaphragm 7 may, if desired, be permanently secured about its periphery in sealed relation to the bowl portion 2 of the dispensing apparatus by any of a number of suitable means, i.e., heat sealing, adhesives, etc. If, however, a disposable diaphragm is desired to permit disposability thereof after each use, a releasable securement means such as O-ring 13 operating in conjunction with circumferential groove 14 in the bowl portion 2 of the dispensing apparatus may be provided. Alternatively, releasable securement means such as an internal bead could be integrally molded into the periphery of the diaphragm, thereby eliminating the use of independent releasable securement means such as O-ring 13. The latter approaches also facilitate easy replacement of the diaphragm 7 in the event it sustains injury in use.

As will further be appreciated by those skilled in the art, the particular material utilized to form the resiliently deformable diaphragm 7 is normally chosen for its strength and conformability. If the dispensing apparatus 1 is intended to handle extremely adherent, dough-like materials, the exterior surface 9 of the diaphragm may be specially treated by means well known in the art to enhance its release properties. In a particularly preferred embodiment of the present invention an elastomeric film of ethyl vinyl acetate, such as Ultathene UE 632 available from U.S. Industrial Chemical Corporation of New York, N.Y., having an initial thickness of approximately 1.2 mils was vacuum thermoformed to fit the cavity within the bowl portion 2 of the dispensing apparatus 1. However, any elastomeric film having suitable strength, conformability, release, and sanitation properties could be employed with equal facility. As will be appreciated by those skilled in the art, the diaphragm could also be injection molded by means well known in the art to the desired shape.

The bowl, neck and handle portions of dispensing apparatus of the present invention may readily be blow molded from synthetic plastic materials such as Type 5602A blow molding grade polyethylene as available from Chemplex Corporation of Rolling Meadows, Ill. Blow molding techniques well known in the art may be utilized to profile the thickness of the various portions so as to provide a substantially rigid bowl portion 2, a substantially rigid neck portion 4 and a resiliently deformable handle portion 3. If desired, the components could be separately formed or fabricated and thereafter assembled, either permanently or temporarily.

The chief design criteria to be considered in sizing the resiliently deformable chamber 5 of the handle portion 3 in relation to the size of the bowl portion 2 is that the volume of fluid, i.e., gas, air, liquid, etc., displaced from the chamber 5 must be sufficient to completely expand and invert the diaphragm 7 from the bowl portion substantially as shown in FIG. 2 to facilitate discharge of the formed product 20 without manual intervention. Alternatively, a suitably sized pump and plunger arrangement could be incorporated into the handle portion of the dispensing apparatus.

As will be appreciated by those skilled in the art, dispensing apparatus of the present invention are not only easy to manufacture at relatively low cost, but in addition provide improved sanitation since the product being dispensed has no opportunity to enter the interior portions of the dispensing apparatus. Furthermore, the bowl portion may readily be cleansed by squeezing the handle portion 3 during the washing operation, thereby totally exposing the product contacting surface 9 of the diaphragm 7.

It is to be understood that the form of the invention herein illustrated and described is to be taken as a preferred embodiment. Various changes or omissions may be made without departing from the spirit or scope of the invention as described in the appended claims.

Having thus defined and described the invention, what is claimed is:

1. A manually operable, self-contained dispensing apparatus for imparting a predetermined shape to discrete units of product of dough-like consistency dispensed therefrom, said apparatus comprising a rigid bowl embodying said predetermined shape, a resiliently deformable diaphragm substantially conforming to and disposed within said bowl releasably secured in sealed relation thereto about its periphery, a substantially rigid neck portion integrally formed with and secured to the exterior of said rigid bowl and an elongated, resiliently deformable handle portion integrally formed with and secured to said substantially rigid neck portion, said resiliently deformable handle portion comprising a resiliently deformable fluid-containing chamber having a wall of lesser thickness than said neck portion in fluid communication with the area intermediate said rigid bowl and the unsecured portion of said resiliently deformable diaphragm through said neck portion, said chamber containing a volume of said fluid sufficient to substantially invert the unsecured portion of said diaphragm from said bowl when said resiliently deformable handle is squeezed, thereby discharging said product without substantially altering its shape and without need for manual intervention to remove said product from said apparatus.

2. The product dispensing apparatus of claim 1, wherein said resiliently deformable diaphragm is comprised of elastomeric film.

3. A manually operable, self-contained dispensing apparatus for imparting a hemispherical shape to discrete units of product of dough-like consistency dispensed therefrom, said apparatus comprising a rigid, substantially hemispherical bowl, a resiliently deformable diaphragm substantially conforming to and disposed within said bowl releasably secured in sealed relation thereto about its periphery, a substantially rigid neck portion integrally formed with and secured to the exterior of said rigid bowl and an elongated, resiliently deformable handle portion integrally formed with and secured to said substantially rigid neck portion, said resiliently deformable handle comprising a resiliently deformable compressible fluid-containing chamber having a wall of lesser thickness than said neck portion in fluid communication with the area intermediate said rigid bowl and the unsecured portion of said resiliently deformable diaphragm through said neck portion, said chamber containing a volume of said compressible fluid sufficient to substantially invert the unsecured portion of said diaphragm from said bowl when said resiliently deformable handle portion is squeezed, thereby reducing said diaphragm and said product to point contact with one another during dispensing without substantially altering its shape and without need for manual intervention.

4. The product dispensing apparatus of claim 3, wherein said resiliently deformable diaphragm is comprised of elastomeric film.

* * * * *

UNITED STATES PATENT AND TRADEMARK OFFICE
CERTIFICATE OF CORRECTION

PATENT NO. : 4,191,517
DATED : March 4, 1980
INVENTOR(S) : Alan E. Byrd et al.

It is certified that error appears in the above—identified patent and that said Letters Patent are hereby corrected as shown below:

Column 6, line 20, after "handle" insert -- portion --.

Signed and Sealed this

Tenth Day of June 1980

[SEAL]

Attest:

SIDNEY A. DIAMOND

Attesting Officer

Commissioner of Patents and Trademarks